(12) United States Patent
Lee et al.

(10) Patent No.: US 9,654,906 B2
(45) Date of Patent: May 16, 2017

(54) METHOD FOR PROCESSING DATA BASED ON BLUETOOTH PROTOCOL AND ELECTRONIC DEVICE THEREOF

(71) Applicant: Samsung Electronics Co., Ltd., Gyeonggi-do (KR)

(72) Inventors: Kook-Hyung Lee, Seoul (KR);
Rasmus Abildgren, Gyeonggi-do (KR);
Sung-Hwan Hyun, Gyeonggi-do (KR);
Chae-Hag Yi, Gyeonggi-do (KR);
Su-Hwan Kim, Gyeonggi-do (KR);
Tae-Sung Kim, Gyeonggi-do (KR);
Young-Joon Choi, Gyeonggi-do (KR);
Eui-Bum Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/738,131

(22) Filed: Jun. 12, 2015

(65) Prior Publication Data
US 2015/0365999 A1    Dec. 17, 2015

Related U.S. Application Data

(60) Provisional application No. 62/011,323, filed on Jun. 12, 2014.

(30) Foreign Application Priority Data

Sep. 1, 2014    (KR) .......................... 10-2014-0115480

(51) Int. Cl.
*H04W 4/00*    (2009.01)
*H04L 29/12*    (2006.01)
*H04R 25/00*    (2006.01)

(52) U.S. Cl.
CPC ........... *H04W 4/008* (2013.01); *H04R 25/558* (2013.01)

(58) Field of Classification Search
CPC ................. H04W 4/008; H04R 25/558; H04L 29/12443; H04L 69/30
See application file for complete search history.

(56) References Cited

U.S. PATENT DOCUMENTS

| 7,599,345 B2 * | 10/2009 | Zheng ............... H04W 36/0016 370/328 |
| 8,656,467 B1 | 2/2014 | Muller et al. |
| 2005/0131764 A1 * | 6/2005 | Pearson ............ G06F 17/30864 705/26.1 |

(Continued)

*Primary Examiner* — Andrew Wendell
(74) *Attorney, Agent, or Firm* — The Farrell Law Firm, P.C.

(57) ABSTRACT

The present disclosure relates to a method and an electronic device for processing data on the basis of a Bluetooth Low Energy (BLE) protocol. The electronic device includes a Bluetooth control module and a processor. The Bluetooth control module stores a modified BLE protocol stack including at least two Attribute Protocols (ATTs) for use with an application, the modified BLE protocol stack includes a first path and a second path. The first path includes a first ATT protocol to process an ATT command of the application, and the second path includes a second ATT protocol to process an ATT command of the application. The processor is coupled to the Bluetooth control module. The processor processes data of the application including the ATT command, using the modified BLE protocol stack including the at least two ATTs of the Bluetooth control module.

20 Claims, 8 Drawing Sheets

(56) References Cited

U.S. PATENT DOCUMENTS

| | | |
|---|---|---|
| 2005/0201403 A1 | 9/2005 | Wang |
| 2005/0281236 A1 | 12/2005 | Takabatake et al. |
| 2006/0258289 A1* | 11/2006 | Dua .................. G06F 17/30058 455/41.3 |
| 2009/0036063 A1 | 2/2009 | Zuniga et al. |
| 2010/0079607 A1* | 4/2010 | Won ....................... G08C 17/02 348/211.2 |
| 2010/0173584 A1 | 7/2010 | Ratermann et al. |
| 2012/0046000 A1 | 2/2012 | Gao et al. |
| 2012/0142271 A1 | 6/2012 | Zhodzishsky et al. |
| 2013/0045684 A1* | 2/2013 | Linde .................... H04W 80/02 455/41.2 |
| 2013/0094552 A1* | 4/2013 | Vedantham .............. H04B 1/38 375/222 |
| 2013/0102251 A1 | 4/2013 | Linde et al. |
| 2013/0109315 A1 | 5/2013 | Polo et al. |
| 2014/0018002 A1 | 1/2014 | Jose et al. |
| 2014/0065967 A1* | 3/2014 | Shen .................... H04W 88/04 455/41.2 |
| 2014/0092806 A1 | 4/2014 | Kidron et al. |
| 2014/0188348 A1* | 7/2014 | Gautama ............... B60W 10/30 701/48 |
| 2014/0281108 A1* | 9/2014 | Pethe .................. G06F 13/4027 710/313 |
| 2014/0328210 A1* | 11/2014 | Knaappila ......... H04W 52/0209 370/254 |
| 2014/0348327 A1* | 11/2014 | Linde .................... H04W 4/008 381/2 |
| 2015/0282088 A1* | 10/2015 | Weizman .......... H04W 52/0245 455/41.2 |

* cited by examiner

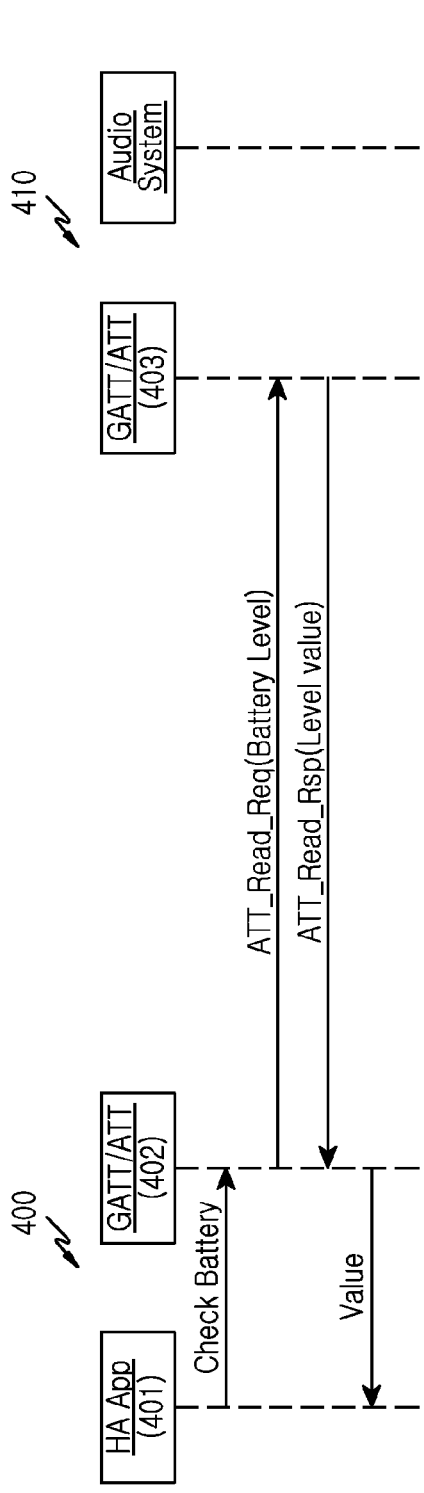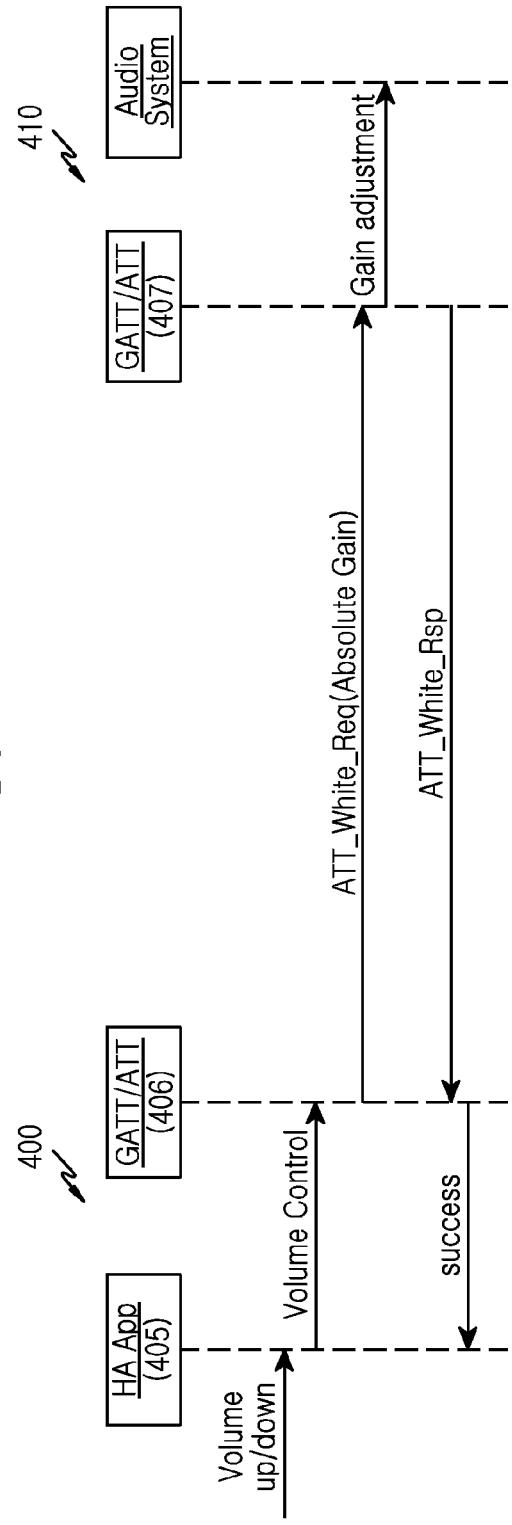
FIG.4A
FIG.4B

METHOD FOR PROCESSING DATA BASED ON BLUETOOTH PROTOCOL AND ELECTRONIC DEVICE THEREOF

PRIORITY

This application claims priority under 35 U.S.C. §119(a) to U.S. Patent Application No. 62/011,323, filed in the United States Patent and Trademark Office on Jun. 12, 2014, and Korean Patent Application Serial No. 10-2014-0115480, filed in the Korean Intellectual Property Office on Sep. 1, 2014, the entire contents of which are incorporated herein by reference.

BACKGROUND

1. Field of Disclosure

The present disclosure relates generally to Bluetooth communication by an electronic device and, more particularly, to a method and an electronic device for processing various types of data on the basis of a modified Bluetooth low power protocol stack.

2. Description of the Related Art

Recently, a service for personal health care has been developed, in which health information of a user is measured using a personal medical device on the basis of a near field communication technology and the measured health information is transmitted through a gateway or a mobile device to a server.

Bluetooth Low Energy (BLE) technology is especially effective for power consumption and product size and is, thus, widely used in various health care-related sensors.

Bluetooth profiles correspond to standards for technologies in which Bluetooth can be utilized, and allow devices supporting the same profile to be compatibly operated. The health-care related Bluetooth profiles, which have been established thus far, include profiles for measuring blood pressure, glucose levels, and heart rates, a thermometer, and a pulse oximeter.

BLE technology is employed in hearing aids to provide various types of functions to users. In particular, BLE technology is applied in the form of an auxiliary device for improving the sound quality of a hearing aid when a sound device, such as a television, a telephone, or an MP3 player, is used. However, products recently released in the market include a product which includes a separate microphone receiving sound using Bluetooth technology and a receiver provided in the form of Bluetooth earphones.

Moreover, a hearing aid application enables an electronic device, such as a smart phone, to control a microphone and an amplifier of a hearing aid or control a receiver of the hearing aid to use the receiver as an earphone.

It is assumed that the hearing aid described herein is based on BLE technology. With the development of various applications relating to the hearing aid, various types of applications not using BLE technology can be used in the hearing aids which are based on BLE technology.

However, some commands defined in a non-BLE based hearing aid application are not able to be used in the BLE protocol stack structure of a BLE-based hearing aid due to certain limitations existing in Android platform implementations.

For example, some commands defined by the hearing aid application are as shown in Table 1 below.

TABLE 1

| Commands | Description |
| --- | --- |
| HA_SUSPEND | Audio reproduction interruption (earphone) |
| HA_RECONFIGURE | Audio configuration change (earphone) |
| HA_START | Audio reproduction start (earphone) |
| HA_CHECK_BATTERY | Battery check (hearing aid) |
| HA_CHANGE_GAIN | Gain change (hearing aid) |

Among the commands, the HA_CHECK_BATTERY and the HA_CHANGE_GAIN can be transferred to a hearing aid using the Generic Attribute Profile (GATT) and Attribute Protocol (ATT) in a hearing aid application of an electronic device (e.g. smart phone).

However, the HA_SUSPEND, the HA_START, and the HA_RECONFIGURE cannot be accessed by the hearing aid application of the electronic device. This is because, in an Android platform, the protocol for audio reproduction of Audio/Video Distribution Transport Protocol (AVDTP) exists on the basis of Bluetooth Basic Rate/Enhanced Data Rate (BR/EDR), and not on the basis of BLE, and the AVDTP can be used to transfer an audio stream, start command, environment configuration, suspend command, etc. to a counterpart device (e.g., the hearing aid). In other words, when a user starts or interrupts music through a User Interface (UI) using a media reproduction application, a media reproduction framework receives the corresponding command and transfers the command to an audio flinger. The audio flinger then transfers the command to the counterpart device. A codec configuration may be directly transferred according to a reproduced sound source regardless of the user input. For example, the user input may be directly transferred to the media reproduction framework. Therefore, a codec configuration may be changed according to a reproduced sound source without a direct relation to the user input.

The BLE technology, which has been developed for the purpose of low energy, does not have protocols for transmission of audio and audio-related commands. Therefore, audio and audio-related commands, such as the HA_SUSPEND, the HA_START, and the HA_RECONFIGURE commands, should be transmitted using an ATT in the BLE protocol stack. However, as described above, the media reproduction application can directly access only the media reproduction framework and cannot access a media task transmitting the corresponding commands.

Therefore, a method and an electronic device for processing various types of data on the basis of the BLE protocol stack are necessary.

SUMMARY

The present disclosure has been made to address at least the problems and disadvantages described above, and to provide at least the advantages described below.

Accordingly, an aspect of the present disclosure is to provide a method and an electronic device for processing various types of data on the basis of the BLE protocol stack.

Accordingly, another aspect of the present disclosure is to provide a method and an electronic device for transferring audio or audio-related commands to a counterpart device in an environment based on a BLE protocol stack.

Accordingly, another aspect of the present disclosure is to provide a method and electronic device for performing communication on the basis of a BLE protocol stack including a plurality of ATTs.

BRIEF DESCRIPTION OF THE DRAWINGS

The above and other aspects, features, and advantages of the present disclosure will be more apparent from the following detailed description taken in conjunction with the accompanying drawings, in which:

FIGS. 4A and 4B illustrate processes of transmitting commands defined in a hearing aid application on the basis of a BLE protocol stack, according to an embodiment of the present disclosure;

DETAILED DESCRIPTION OF EMBODIMENTS OF THE PRESENT DISCLOSURE

Figure 1:
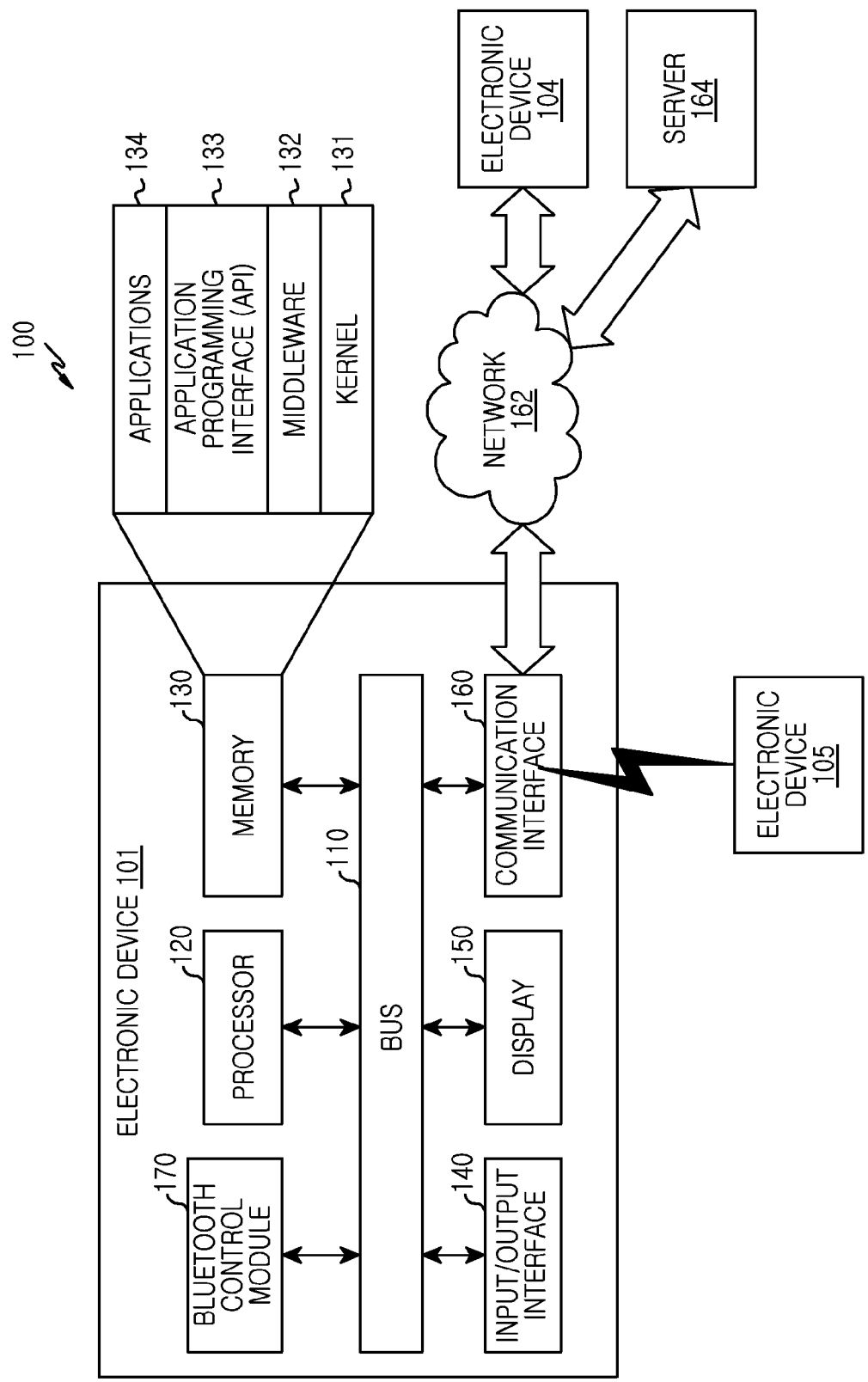
FIG. 1 illustrates a network environment including an electronic device, according to an embodiment of the present disclosure.

Hereinafter, embodiments of the present disclosure will be described in conjunction with the accompanying drawings. The present disclosure may have various modifications and embodiments, and specific embodiments thereof are illustrated in the drawings and described in detail. However, it should be understood that the present disclosure is not limited to the particular embodiments, but includes all modifications, equivalents, and/or alternatives within the spirit and scope of the present disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof. The expression "or" includes any or all combinations of words enumerated together. For example, the expression "A or B" may include A, may include B, or may include both A and B. Expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be referred to as a second element, and similarly, a second element could be referred to as a first element without departing from the scope of various embodiments of the present disclosure.

In the case where an element is referred to as being "connected" to or "accessed" by another element, it should be understood that not only may the element be directly connected to or accessed by the other element, but also a new element may exist between the two elements. Meanwhile, in the case where an element is referred to as being "directly connected to" or "directly accessing" another element, it should be understood that no element exists between the two elements.

As used herein, terms are used merely for describing specific embodiments and are not intended to limit the scope of the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which various embodiments of the present disclosure pertains. Such terms as those defined in a generally used dictionary are to be interpreted to have meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smart watch).

According to some embodiments, the electronic device may be a smart home appliance with a communication function. The smart home appliance as an example of the electronic device may include at least one of a television, a Digital Versatile Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various medical appliances (e.g. Magnetic Resonance Angiography (MRA), Magnetic Resonance Imaging (MRI), Computed Tomography (CT) machine, a movie camera, and an ultrasonic machine), navigation devices, Global Positioning System (GPS) receivers, Event Data Recorders (EDRs), Flight Data Recorders (FDRs), automotive infotainment devices, electronic equipment for ships (e.g. navigation equipment for ships, gyrocompasses, or the like), avionics, security devices, head units for vehicles, industrial or home robots, Automatic Teller Machines (ATM), and Point Of Sales (POS) systems.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. An electronic device according to various embodiments of the present disclosure may be a flexible device. Further, it is obvious to those skilled in the art that the electronic device according to various embodiments of the present disclosure is not limited to the aforementioned devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIG. 1 illustrates a network environment including an electronic device, according to an embodiment of the present disclosure.

Referring to FIG. 1 a network environment 100 and an electronic device 101 are provided. The electronic device 101 includes a bus 110, a processor 120, a memory 130, an input/output interface 140, a display 150, a communication interface 160, and a Bluetooth control module 170.

The bus 110 is a circuit which interconnects the above-described elements and delivers communication (e.g., a control message) between the above-described elements.

For example, the processor 120 receives commands from the aforementioned other elements (e.g., the memory 130, the input/output interface 140, the display 150, the communication interface 160, and the Bluetooth control module 170) through the bus 110, deciphers the received commands, and performs calculation or data processing according to the deciphered commands.

The memory 130 stores commands or data received from or created by the processor 120 or other elements (e.g., the input/output interface 140, the display 150, the communication interface 160, or the Bluetooth control module 170). The memory 130 may include programming modules, such as a kernel 131, middleware 132, an Application Programming Interface (API) 133, and an applications 134. The aforementioned programming modules may be formed of software, firmware, hardware, or a combination of at least two thereof.

The kernel 131 controls or manages system resources (e.g., the bus 110, the processor 120, or the memory 130) used for executing an operation or a function implemented in the other programming modules, for example, the middleware 132, the API 133, or the applications 134. In addition, the kernel 131 may provide an interface through which the middleware 132, the API 133, or the applications 134 control or manage the individual elements of the electronic device 101 while accessing the individual elements.

The middleware 132 performs a relay function allowing the API 133 or the applications 134 to communicate with the kernel 131 to exchange data therewith. Furthermore, in regard to task requests received from the applications 134, the middleware 132 performs a control (e.g., scheduling or load balancing) for the task requests, using a method of allocating at least one of the applications 134 a priority for using the system resources (e.g., the bus 110, the processor 120, and the memory 130) of the electronic device 101.

The API 133 is an interface through which the applications 134 controls functions provided by the kernel 131 or the middleware 132, and may include at least one interface or function (e.g., command) for file control, window control, image processing, or text control.

According to various embodiments, the applications 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing atmospheric pressure, humidity, temperature, and the like). Additionally or alternately, the applications 134 may include an application related to the exchange of information between the electronic device 101 and an external electronic device 104. The application related to the exchange of information may include, for example, a notification relay application for transferring particular pieces of information to the external electronic device 104 or a device management application for managing the external electronic device 104.

The notification relay application includes a function of transferring, to the external electronic device 104, notification information generated in other applications of the electronic device 101 (e.g., an SMS/MMS application, an e-mail application, a health management application, an environmental information application, and the like). Additionally or alternatively, the notification relay application may receive notification information from, for example, the external electronic device 104 and provide the received notification information to a user.

The device management application manages (e.g., install, delete, or update) functions for at least a part of the external electronic device 104 communicating with the electronic device 101 (e.g., turning on/off the external electronic device 104 itself (or some elements thereof) or adjusting the brightness (or resolution) of a display), applications operating in the external electronic device 104, or services (e.g., a telephone call service or a message service) provided from the external electronic device 104.

According to various embodiments, the applications 134 may include an application appointed according to the attribute (e.g., the type) of the external electronic device 104. For example, in cases where the external electronic device 104 is an MP3 player, the applications 134 may include an application related to the reproduction of music. Similarly, in cases where the external electronic device 104 is a mobile medical appliance, the applications 134 may include an application related to health care. According to one embodiment, the applications 134 may include at least one of an application designated to the electronic device 101 and an application received from the external electronic device 104 or a server 106.

The input/output interface 140 transfers commands or data input from a user through an input/output device (e.g., the sensor, a keyboard, or a touch screen) to, for example, the processor 120, the memory 130, the communication interface 160, or the Bluetooth control module 170 through the bus 110. For example, the input/output interface 140 may provide, to the processor 120, data for a user's touch input through the touch screen. Furthermore, through the input/output device (e.g., a speaker or a display), the input/output interface 140 may output commands or data received from the processor 120, the memory 130, the communication interface 160, or the Bluetooth control module 170 through the bus 110. For example, the input/output interface 140 may output voice data, processed through the processor 120, to a user through a speaker.

The display 150 displays various pieces of information (e.g., multimedia data or text data) to a user.

The communication interface 160 connects communication between the electronic device 101 and the external electronic device 104 or 105 or the server 106. For example, the communication interface 160 may be connected to a network 162 through wireless or wired communication to communicate with the external electronic device 104 or 105 or the server 106. The wireless communication may include at least one of, Wi-Fi, Bluetooth (BT), Near Field Communication (NFC), Global Positioning System (GPS) and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, a Universal Serial Bus (USB), a High Definition Multimedia Interface (HDMI), Recommended Standard 232 (RS-232), and a Plain Old Telephone Service (POTS).

According to one embodiment, the network 162 may be a telecommunication network. The communication network may include at least one of a computer network, the Internet, the Internet of Things, and a telephone network. According to one embodiment, a protocol (e.g., a transport layer protocol, data link layer protocol, or a physical layer protocol) for communication between the electronic device 101 and an external device may be supported by at least one of the applications 134, the application programming interface 133, the middleware 132, the kernel 131, and the communication interface 160.

The Bluetooth control module 170 processes at least some information acquired from other elements (e.g. the processor 120, the memory 130, the input/output interface 140, or the communication interface 160) and provides the processed information to a user in various methods. For example, based on a Bluetooth connection between the electronic device 101 and an external device, the Bluetooth control module 170 can perform communication with an external device (e.g. a hearing aid). For example, according to a hearing aid application, the Bluetooth control module 170 controls a microphone and an amplifier of a hearing aid and controls a receiver of the hearing aid in order to transfer an audio signal to the hearing aid.

As defined in the Bluetooth Specification Version 4.1 [Vol. 3], Part A, Section 2.1, the Channel IDentifier (CID) for an Attribute Protocol (ATT) is fixed to 0x0004. That is, only one ATT exists in a device.

Since the ATT corresponds to a sequential request-response protocol, no processing can be performed before a response after a request between two devices using the ATT. Since the ATT of the current single structure has a limitation of simultaneously performing various operations in order to enable various applications operating on a modularized platform, which provides various services, such as the Android platform, to use the lower electric power of the Bluetooth, various embodiments of the present disclosure propose a structure using a plurality of ATTs. For example, in the case of a hearing ad, a structure using two ATTs offers efficiency for a media task layer and a hearing aid application layer.

An electronic device includes a Bluetooth control module and a processor. The Bluetooth control module stores a modified BLE protocol stack including at least two ATTs for use of an application, the modified BLE protocol stack includes a first path and a second path. The first path includes a first ATT protocol to process an ATT command of the application, the second path includes a second ATT protocol to process an ATT command of the application. The processor is coupled to the Bluetooth control module. The processor can process data of the application including the ATT command, using the modified BLE protocol stack including the at least two ATTs of the Bluetooth control module.

The first path may include an application layer, a GATT, the first ATT protocol, a Logical Link Control and Adaptation Protocol (L2CAP), and a link layer.

The second path may include an audio layer, the second ATT protocol, an L2CAP, and a link layer.

The ATT command of the application may be an audio-related command.

The first ATT protocol may use a fixed channel identifier and the second ATT protocol may use a channel identifier allocated to a reserved area or a dynamic allocation area.

The modified BLE protocol stack may further include a third path including a Digital Signal Processing (DSP), an L2CAP, and a link layer.

Figure 2:
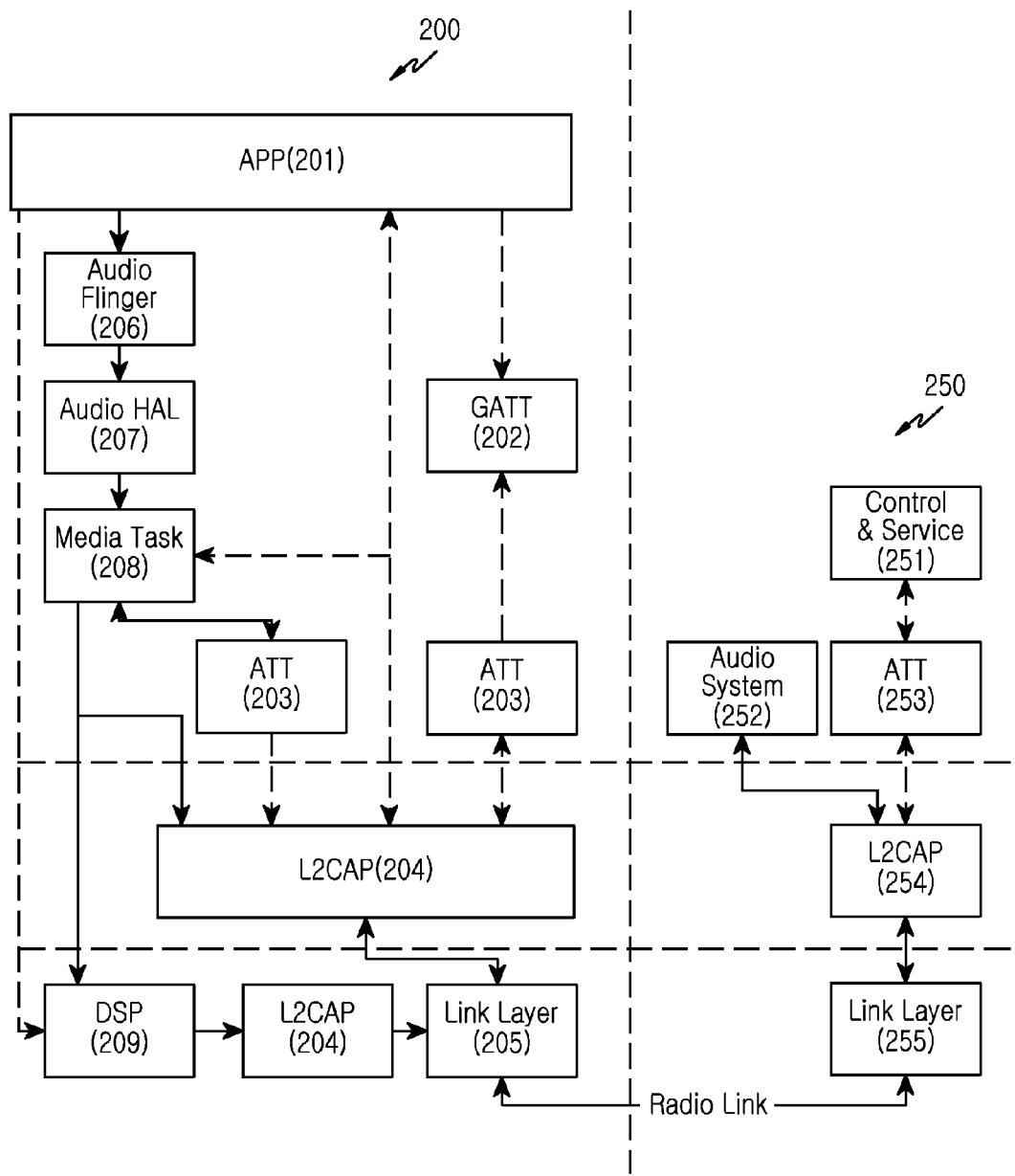
FIG. 2 illustrates a Bluetooth Low Energy (BLE) protocol stack structure for connection between electronic devices, according to an embodiment of the present disclosure.

FIG. 2 illustrates a Bluetooth Low Energy (BLE) protocol stack structure for connection between electronic devices, according to an embodiment of the present disclosure.

Referring to FIG. 2, a BLE protocol stack structure for connection between electronic devices 200 and 250 is provided. The electronic device 200 (e.g. smart phone) include a BLE protocol stack structure (hereinafter, referred to as a modified BLE protocol stack structure), including a first path and a second path for processing ATT-based data or commands. For example, data or a command in the second path may be an audio-related command processed according to an AVDTP on the basis of Bluetooth BR/EDR.

The first path for processing BLE-based ATT data or commands includes an application layer 201, a Generic ATTribute Profile (GATT) 202, an ATTribute (ATT) protocol 203, a Logical Link Control and Adaptation Protocol (L2CAP) 204, and a link layer 205.

The second path for processing BLE-based ATT data or commands includes the application layer 201, an audio flinger 206, an audio Hardware Abstraction Layer (HAL) 207, a media task 208, the ATT 203, the L2CAP 204, and the link layer 205. Otherwise, when there is no user input, the second path for processing BLE-based ATT data or commands includes the media task 208, the ATT 203, the L2CAP 204, and the link layer 205.

According to various embodiments, a third path including the Digital Signal Processing (DSP) 209, the L2CAP 204, and the link layer 205 may be included in the modified BLE protocol stack structure. In implementation, audio data may be transferred through the third path. The DSP 209 processes an input signaling from the application layer 201 (e.g. Voice call data) or the media task 208 (e.g. music data). For example, audio data may be transferred directly to the L2CAP 204 or the DSP 209 from the media task 208 without passing through the ATT.

Although FIG. 2 illustrates two L2CAPs 204 included in the modified BLE protocol stack structure, one skilled in the art apply one L2CAP 204 or more than two L2CAPs 204 thereto.

Further, according to the application type and the application command type, more than two ATTs 203 may be used for the modified BLE stack structure. For example, ATTs may exist in the modified BLE protocol stack structure according to the application type or ATTs may exist in the modified BLE protocol stack structure according to the application command type.

In the modified BLE protocol stack structure, each application program 201 is implemented at the upper end of a Generic Access Profile (GAP) or the GATT 202. Basically, Bluetooth is divided into two parts, a host (e.g. GATT, ATT, and L2CAP) and a controller. The host performs a protocol of a high level, like a security function. The controller (e.g. link layer and physical layer) performs a function of a low level, such as a link management or base operation in a physical channel. The host may include the other parts of the application program.

The GAP directly communicates with the application program. In the GAP, idle and connecting mode processes are defined. While the connecting mode process manages a connection to a device, the idle mode process includes a discovery of Bluetooth devices. Further, the GAP provides a security process of a high level, such as encryption of connection.

The ATT 203 defines communication between two devices performing functions of a server and a client in a higher layer of a dedicated L2CAP channel. The server manages an attribute set. The attribute has a data structure for storing information managed by the GATT 202 operating in a higher layer of the ATT 203, and is separate from the function of a slave or a master. For example, the attribute may include an attribute handle, attribute type, attribute value, and attribute permission.

The client accesses the attribute of the server by sending a request for triggering of a response message by the server. Further, the server transmits an unidentified notification and an indication, which is required to send identification thereof to the client, to the client. Further, the client transmits a command to the server, to enable an attribute value to be written.

In order to find a service and exchange characteristics between one device and another device, the GATT 202 defines a framework used by the ATT 203. The characteristics correspond to a data set including values and properties. Services and data relating to characteristics are stored in the attribute. For example, a server for operating a "temperature sensor" service may transact the "temperature" characteristic using an attribute for describing the sensor, an attribute for storing temperature measurement, and an additional attribute for specifying a measurement unit.

The L2CAP 204 is a protocol for setting/managing a logical link relating to higher layer protocols and applications by using a link configured in the link layer 205. A transport function of the logical link managed by the L2CAP 204 includes logical channel management, protocol multiplexing, packet segmentation (fragmentation) and reconstruction, Quality of Service (QoS), and grouping. The higher layer protocol operating using such a function includes a plurality of ATTs 203 defined therein. The logical channel refers to a channel configured for data transferred in an application or a protocol of a higher layer of the L2CAP 204.

For example, on the basis of protocol multiplexing, the L2CAP 204 relays data transferred from the plurality of ATTs 203, configures and manages each piece of data according to the logical channel, and then transfers the data to a lower layer protocol (e.g. link layer 205).

Further, segmentation and reassembly of a protocol are performed by the L2CAP 204. In the link layer 205, the lengths of packets are limited in view of the relation to the Maximum Transfer Unit (MTU). Therefore, when the length of a packet transferred from an application or a higher layer protocol is long, the packet should be segmented according to the limitation on the length of a baseband packet. In contrast, multiple baseband packets, which have been received after being divided, are reassembled before being transferred to a higher layer protocol or application. In addition, the L2CAP 204 performs work related to grouping at the time of configuring a piconet or QoS.

The link layer 205 controls the status of a BLE device. This device may enter standby, advertisement, scanning, initiating, and connection states. The advertisement state allows a BLE device to discover other devices, connect to another device, or broadcast user data. The advertisement is introduced in the BLE section of the Bluetooth Specification Version 4.0. Three channels, for example, channels 37, 38, and 39, are reserved in order to send an advertisement. Therefore, advertisements are transmitted sequentially and one by one to channels. A device listening to the advertisement is required to be in a scanning state. The initiating state may be entered in order to start the connection state, and the connection state allows active participation in the connection. The standby state allows entry into safe power consumption when no messages are exchanged. Moreover, the link layer 205 takes charge of transmission, framing, and prevention of error in a particular link, and performs error detection and correction.

In the second path for processing the BLE-based ATT data or commands, the audio flinger 206 mixes audio data of multiple applications and sends the mixed data to various output devices, the audio HAL 207 corresponds to a set of routines for processing hardware-subordinate details necessary for implementing audio-related input/output interface, interrupt control, and multi-processor communication, and the media task 208 can process audio-related tasks.

Meanwhile, through the first path (e.g. the path including the application layer 201, the GATT 202, the ATT 203, the L2CAP 204, and the link layer 205) in the electronic device 200, a command of the corresponding application may be transferred to the electronic device 250.

The electronic device 250 performs corresponding work within a control/service layer 251 according to the command of the corresponding application transferred through the link layer 255, the L2CAP 254, and the ATT 253. For example, according to a volume control or battery check command of a hearing aid application, the electronic device 250 may control the volume of the hearing aid or check the current battery state of the hearing aid and provide a result thereof to the electronic device 200.

In various embodiments, through the second path (e.g. the path including the application layer 201, the audio flinger 206, the audio HAL 207, the media task 208, the ATT 203, the L2CAP 204, and the link layer 205 or the path including the media task 208, the ATT 203, the L2CAP 204, and the link layer 205) in the electronic device 200, a related command may be transferred to the electronic device 250. For example, an audio-related command may be transferred to the electronic device 250 through the second path.

The electronic device 250 processes audio data transferred through the link layer 255, the L2CAP 254, and the ATT 253, and the audio-related command may be processed after being transferred through the link layer 255, the L2CAP 254, and the ATT 253.

In other various embodiments, through the third path (e.g. the path including the DSP 209, the L2CAP 204, and the link layer 205) in the electronic device 200, audio data is transferred to the electronic device 250.

Figure 3A:
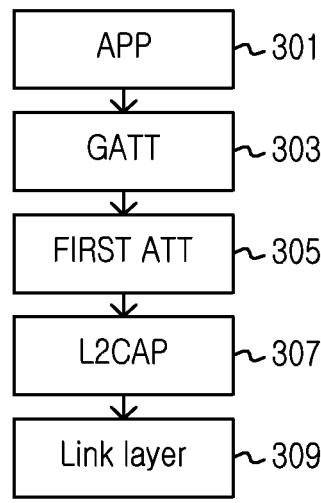
FIG. 3A illustrates a BLE stack structure, according to an embodiment of the present disclosure.

FIG. 3A illustrates a BLE stack structure, according to an embodiment of the present disclosure.

Referring to FIG. 3A, a packet data processing procedure in a BLE protocol stack structure of the electronic device 101 is provided. BLE-based packet data is transferred to a counterpart device through an application layer 301, a GATT 303, a first ATT 305, an L2CAP 307, and a link layer 309, and BLE-based packet data is received from a counterpart device through the GATT 303, the first ATT 305, the L2CAP 307, the link layer 309, the L2CAP 307, the first ATT 305, the GATT 303, and the application layer 301.

Figure 3B:
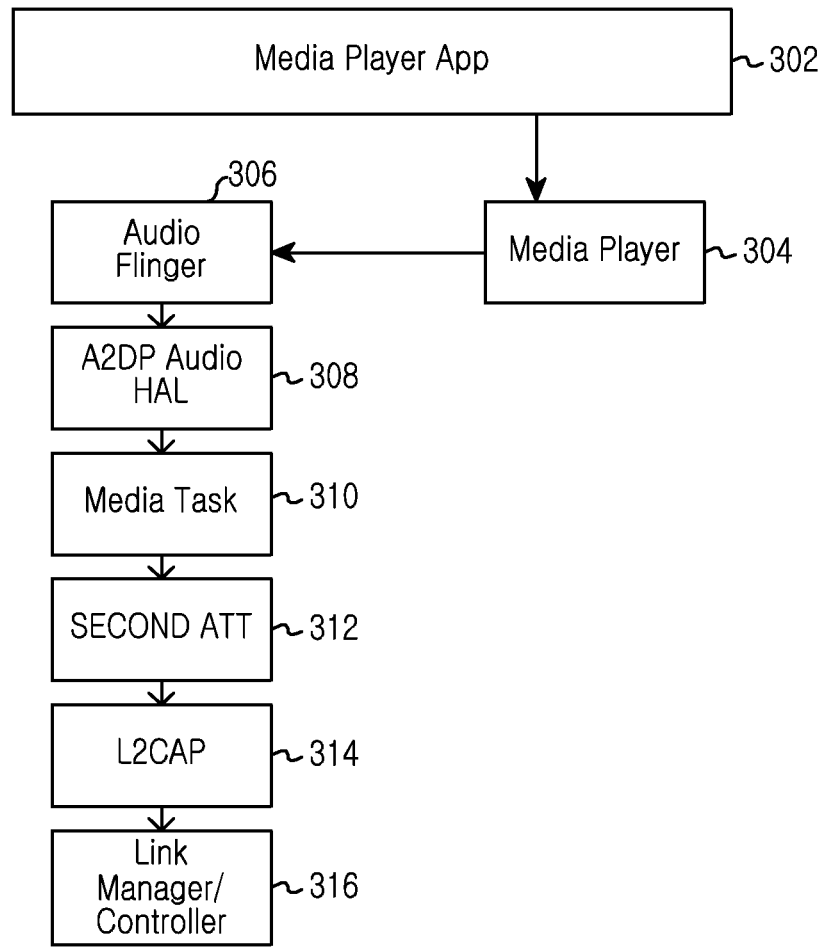
FIG. 3B illustrates a BLE protocol stack structure for audio signaling, according to an embodiment of the present disclosure.

FIG. 3B illustrates a BLE protocol stack structure for audio signaling, according to an embodiment of the present disclosure.

Referring to FIG. 3B, a procedure for processing audio signaling in a BLE protocol stack structure of the electronic device 101 is provided. BLE-based audio signaling (e.g. control signal or audio data) is transferred to a counterpart device through an application layer 302, a media player 304, an audio flinger 306, an Advanced Audio Distribution Profile (A2DP) audio HAL 308, a media task 310, a second ATT 312, an L2CAP 314, and a link layer 316.

In various embodiments, the first ATT 305 may use a fixed L2CAP Channel ID (CID; e.g. 0x0004) and the second ATT 312 may use an unfixed L2CAP CID (e.g. a channel identifier newly added to a reserved or dynamically allocated area).

According to various embodiments, both the first ATT 305 and the second ATT 312 may use an unfixed L2CAP CID (e.g. a channel identifier newly added to a reserved or dynamically allocated area).

FIGS. 4A and 4B illustrate processes of transmitting commands defined in a hearing aid application on the basis of a BLE protocol stack, according to an embodiment of the present disclosure.

Referring to FIG. 4A, when a check battery request is generated in a hearing aid application 401 in the electronic device 400, a check battery command is transferred through GATT/ATT 403 to an electronic device 410 (e.g. hearing aid), and the electronic device 410 transfers a response to the check battery request to the electronic device 400 through the GATT/ATT 402.

Referring to FIG. 4B, when a volume up/down command request for a hearing aid is generated in a hearing aid application 405 in the electronic device 400, the volume up/down command is transferred through GATT/ATT 407 to an electronic device 410 (e.g. hearing aid), and the electronic device 410 controls the volume of the hearing aid according to the volume up/down command request and then transfers a response to the volume up/down request to the electronic device 400 through the GATT/ATT 406.

Figure 5:
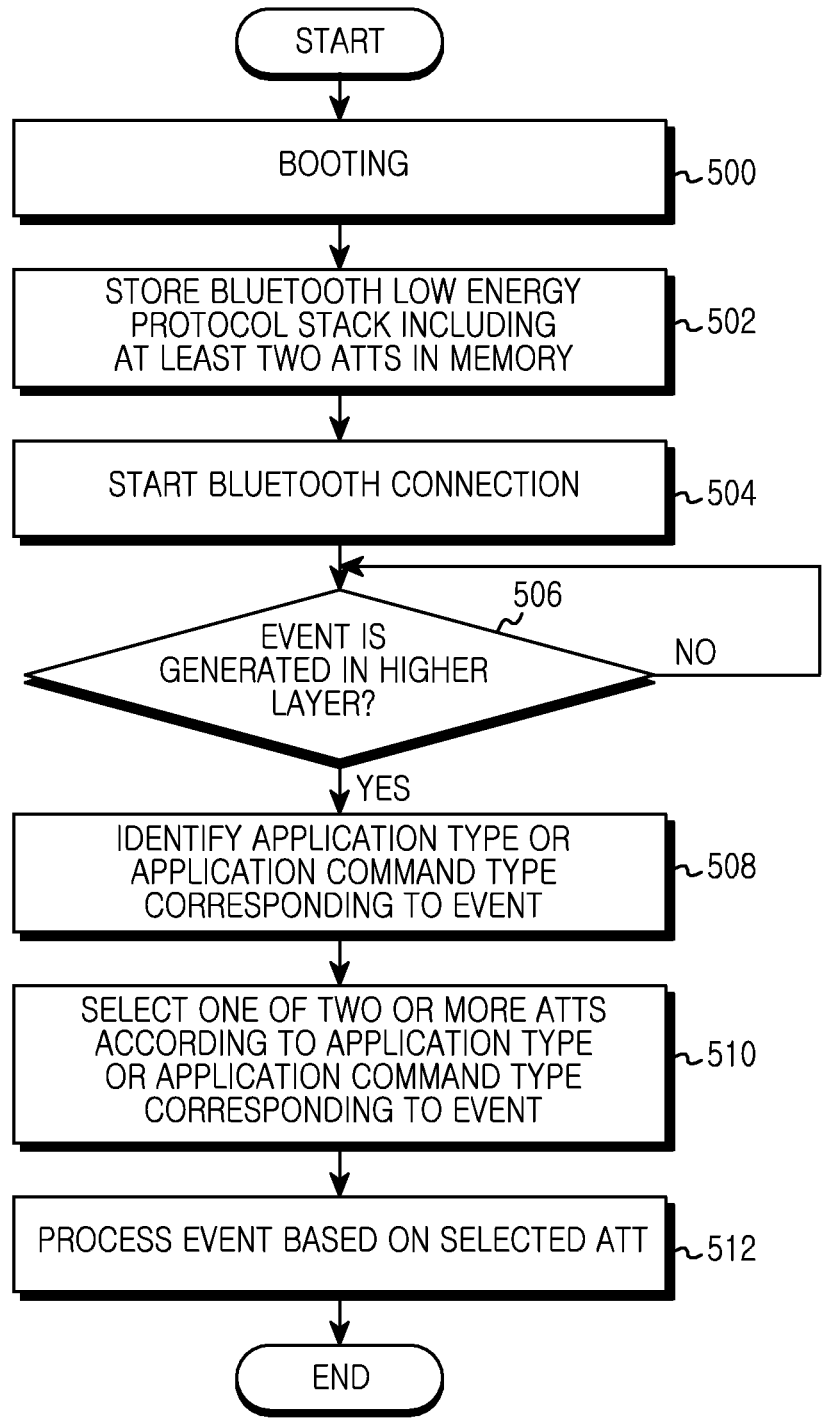
FIG. 5 is a flowchart of a process of transmitting commands defined in a hearing aid application on the basis of a BLE protocol stack, according to an embodiment of the present disclosure.

FIG. 5 is a flowchart of a process of transmitting commands defined in a hearing aid application on the basis of a Bluetooth low energy protocol stack, according to an embodiment of the present disclosure.

Referring to FIG. 5, an electronic device 101 starts booting or rebooting according to a pre-defined process when electric power is supplied in step 500.

In step 502, the electronic device 101 stores, in a memory 130, a BLE protocol stack including at least two ATTs. For example, at the time of booting or rebooting, the electronic device 101 loads related protocols in the memory 130 in order to perform BLE communication. Further, the BLE protocol stack including at least two ATTs is used in order to process BLE-based data (e.g. a user input signal of a hearing aid application) and data (e.g. audio-related signaling) which is not based on BLE technology.

In step 504, the electronic device 101 starts a BLE-based connection according to a pre-defined process.

In step 506, the electronic device 101 determines whether an event is generated in a higher layer (e.g. a media task layer or application layer, which are higher layers of the ATT layer). For example, the electronic device 101 determines whether a battery check request, a volume control request, or audio-related signaling is generated in a hearing aid application.

The electronic device 101 identifies the application type or application command type corresponding to the event in step 508, and selects one of two or more ATTs according to the application type or application command type corresponding to the event in step 510.

In step 512, the electronic device 101 processes the event, using the selected ATT. For example, the electronic device 101 may transfer, among the hearing aid application commands, the HA_CHECK_BATTERY and HA_CHANGE_GAIN commands to the hearing aid using the GATT and ATT (see FIGS. 2 and 3A). The electronic device may transfer the HA_SUSPEND, HA_START, and HA_RECONFIGURE commands to a counterpart device using a protocol or another ATT for audio reproduction of AVDTP on the basis of Bluetooth BR/EDR (see FIGS. 2 and 3B).

Figure 6:
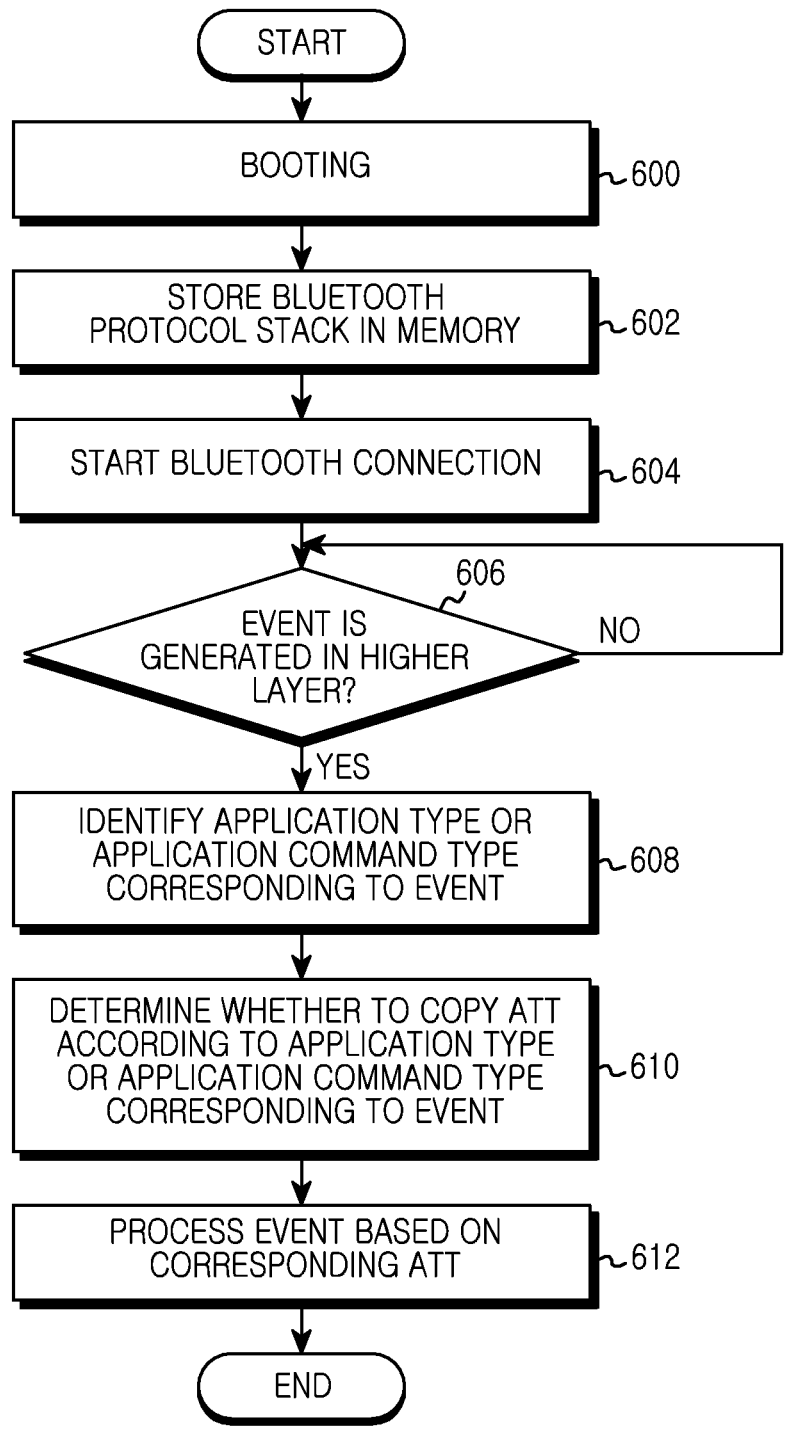
FIG. 6 is a flowchart of a process of transmitting commands defined in a hearing aid application on the basis of a BLE protocol stack, according to another embodiment of the present disclosure.

FIG. 6 is a flowchart of a process of transmitting commands defined in a hearing aid application on the basis of a BLE protocol stack, according to another embodiment of the present disclosure.

Referring to FIG. 6, an electronic device 101 starts booting or re-booting according to a pre-defined process when electric power is supplied in step 600.

In step 602, the electronic device 101 stores a BLE protocol stack in a memory 130. For example, at the time of booting or rebooting, the electronic device 101 loads related protocols in the memory 130 in order to perform a BLE communication including one ATT.

In step 604, the electronic device 101 starts a BLE-based connection according to a pre-defined process.

In step 606, the electronic device 101 determines whether an event is generated in a higher layer (e.g. a media task layer or application layer, which are higher layers of the ATT layer). For example, the electronic device 101 determines whether a battery check request, a volume control request, or audio-related signaling is generated in a hearing aid application.

The electronic device 101 identifies the application type or application command type corresponding to the event in step 608, and determines whether to copy at least one different ATT according to the application type or application command type corresponding to the event in step 610.

In step 612, the electronic device 101 processes the event, using a corresponding ATT. For example, the electronic device 101 may transfer, among the hearing aid application commands, the HA_CHECK_BATTERY and HA_CHANGE_GAIN commands to the hearing aid using the GATT and ATT (see FIGS. 2 and 3A). The electronic device 101 may transfer the HA_SUSPEND, HA_START, and HA_RECONFIGURE commands to a counterpart device using the copied ATT since it is required to use a protocol for audio reproduction of AVDTP on the basis of Bluetooth BR/EDR (see FIGS. 2 and 3B).

Figure 7:
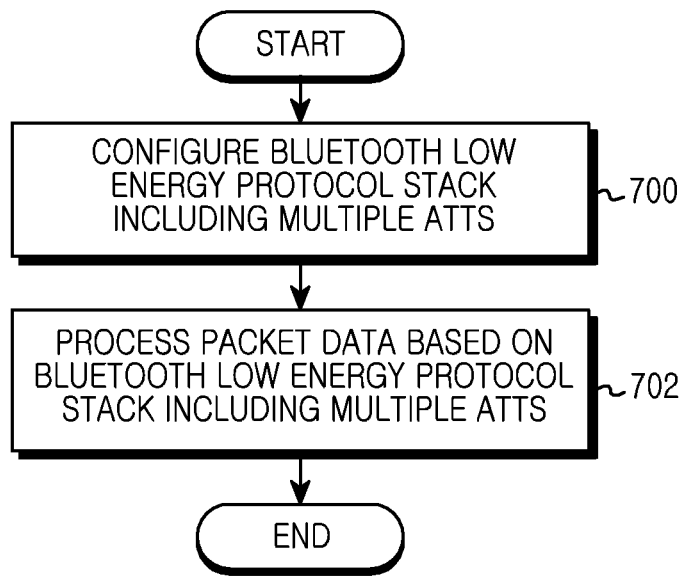
FIG. 7 is a flowchart of a process for processing data on the basis of a BLE protocol stack, according to an embodiment of the present disclosure.

FIG. 7 is a flowchart of a process for processing data on the basis of a BLE protocol stack, according to an embodiment of the present disclosure.

Referring to FIG. 7, the electronic device 101 configures a BLE protocol stack including at least two ATTs in step 700.

In step 702, the electronic device 101 processes packet data on the basis of the configured BLE protocol stack including the at least two ATTs.

The methods described above with reference to FIGS. 5-7 can be further implemented in a device (e.g., a chip set).

Figure 8:
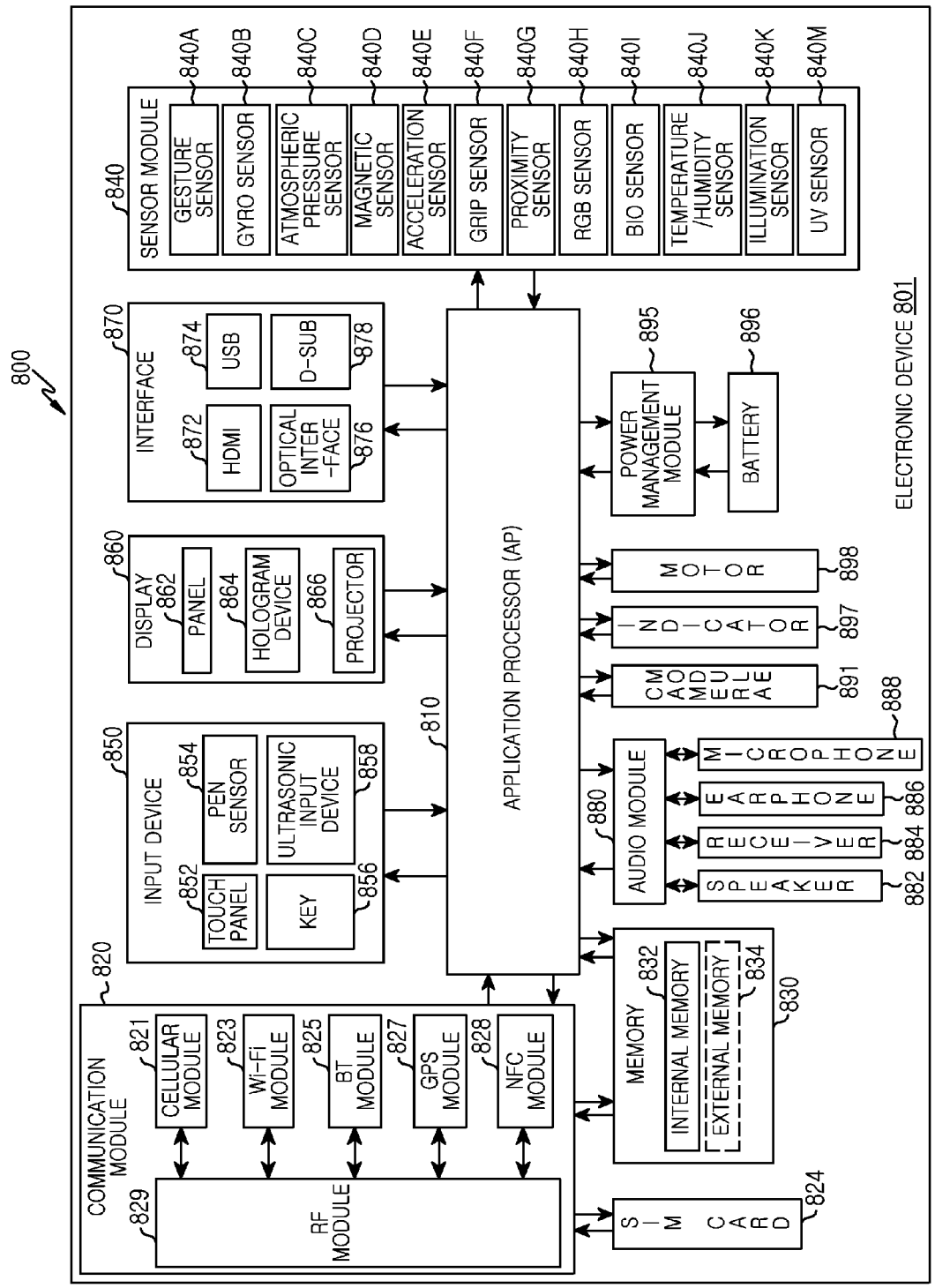
FIG. 8 is a block diagram illustrating a configuration of an electronic device, according to an embodiment of the present disclosure.

FIG. 8 is a block diagram illustrating a configuration of an electronic device, according to various embodiments of the present disclosure.

Referring to FIG. 8, electronic device 801 is provided in block diagram 800. The electronic device 801 may, for example, constitute all or a part of the electronic device 101 shown in FIG. 1. The electronic device 801 includes at least one Application Processor (AP) 810, a communication module 820, a Subscriber Identifier Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 controls a plurality of hardware or software elements connected to the AP 810 by driving an operating system or an application program, processes various types of data including multimedia data, and performs calculations. The AP 810 may be implemented by, for example, a System on Chip (SoC). According to one embodiment, the AP 810 may further include a Graphic Processing Unit (GPU).

The communication module 820 (e.g., the communication interface 160) performs data transmission/reception in communication between the electronic device 801 (e.g., the electronic device 101) and other electronic devices (e.g., the electronic device 104 or the server 106) connected thereto through a network (e.g., network 162). According to an embodiment, the communication module 820 may include a cellular module 821, a Wi-Fi module 823, a BT module 825, a GPS module 827, an NFC module 828, and a Radio Frequency (RF) module 829.

The cellular module 821 provides a voice call, a video call, a Short Message Service (SMS), or an Internet service through a communication network (e.g., LTE, LTE-A, CDMA, WCDMA, UMTS, WiBro, or GSM). Furthermore, the cellular module 821 distinguishes and authenticates electronic devices within a communication network using, for example, a subscriber identification module (for example, the SIM card 824). According to one embodiment, the cellular module 821 may perform at least some functions which the AP 810 provides. For example, the cellular module 821 may perform at least some of the multimedia control functions.

According to one embodiment, the cellular module 821 may include a Communication Processor (CP). Furthermore, the cellular module 821 may be implemented by, for example, an SoC. Although the elements, such as the cellular module 821 (e.g., a communication processor), the memory 830, and the power management module 895, are illustrated to be separate from the AP 810 in FIG. 8, the AP 810 may include at least some (e.g., the cellular module 821) of the aforementioned elements in an embodiment.

According to an embodiment, the AP 810 or the cellular module 821 (e.g., communication processor) loads, in a volatile memory, a command or data received from at least one of a non-volatile memory and other elements connected thereto, and processes the loaded command or data. Furthermore, the AP 810 or the cellular module 821 stores data received from or generated by at least one of other elements in a non-volatile memory.

Each of the Wi-Fi module 823, the BT module 825, the GPS module 827, and the NFC module 828 may include, for example, a processor for processing data transmitted or received through a corresponding module. In FIG. 8, the cellular module 821, the Wi-Fi module 823, the BT module 825, the GPS module 827, and the NFC module 828 are illustrated as separate blocks, but at least some (for example, two or more) of the cellular module 821, the Wi-Fi module 823, the BT module 825, the GPS module 827, and the NFC module 828 may be included in one Integrated Chip (IC) or one IC package. For example, at least some (e.g., the communication processor corresponding to the cellular module 821 and the Wi-Fi processor corresponding to the Wi-Fi module 823) of the processors corresponding to the cellular module 821, the Wi-Fi module 823, the BT module 825, the GPS module 827, and the NFC module 828 may be implemented by one SoC.

The RF module 829 transmits/receives data, for example, an RF signal. The RF module 829 may, for example, include a transceiver, a power amp module (PAM), a frequency filter, a low noise amplifier (LNA), or the like. Further, the RF module 829 may further include an element for transmitting/receiving electronic waves over a free air space in wireless communication, for example, a conductor, a conducting wire or the like. Although the cellular module 821, the Wi-Fi module 823, the BT module 825, the GPS module 827, and the NFC module 828 share one RF module 829 in FIG. 8, at least one of the cellular module 821, the Wi-Fi module 823, the BT module 825, the GPS module 827, and the NFC module 828 may transmit/receive an RF signal through a separate RF module in one embodiment.

The SIM card 824 is a card that may be inserted into a slot formed in a particular portion of the electronic device. The SIM card 824 includes unique identification information (for example, an Integrated Circuit Card IDentifier (ICCID)) or subscriber information (for example, International Mobile Subscriber Identity (IMSI)).

The memory 830 (e.g., the memory 130) may include an internal memory 832 or an external memory 834. The internal memory 832 may include, for example, at least one of a volatile memory (e.g., a Dynamic RAM (DRAM), a Static RAM (SRAM), and a Synchronous Dynamic RAM (SDRAM)), and a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory).

According to one embodiment, the internal memory 832 may be a Solid State Drive (SSD). The external memory 834 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 834 may be functionally connected to the electronic device 801 through various interfaces. The electronic device 801 may further include a storage device (or a storage medium) such as a hard disc drive.

The sensor module 840 measures a physical quantity or detects an operation state of the electronic device 801 and converts the measured or detected information to an electric signal. The sensor module 840 includes at least one of, a gesture sensor 840A, a gyro sensor 840B, an atmospheric pressure sensor 840C, a magnetic sensor 840D, an acceleration sensor 840E, a grip sensor 840F, a proximity sensor 840E a color sensor 840H (for example, red, green, and blue (RGB) sensor), a bio-sensor 840I, a temperature/humidity sensor 840J, an illumination sensor 840K, and a Ultra Violet (UV) sensor 840M. Additionally or alternatively, the sensor module 840 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 840 may further include a control circuit for controlling at least one sensor involved therein.

The input device 850 may include a touch panel 852, a (digital) pen sensor 854, a key 856, or an ultrasonic input device 858.

The touch panel 852 recognizes a touch input in at least one of, a capacitive scheme, a resistive scheme, an infrared scheme, and an acoustic wave scheme. Further, the touch panel 852 may further include a control circuit. In the case of the capacitive type, physical contact or proximity recognition is possible. The touch panel 852 may further include a tactile layer. In this event, the touch panel 852 provides a tactile response to the user.

The (digital) pen sensor 854 may be implemented, using the same or a similar method to receiving a user's touch input or using a separate recognition sheet.

The key 856 may include, for example, a physical button, an optical key, or a keypad.

The ultrasonic input device 858 identifies data by detecting an acoustic wave with a microphone 888 of the electronic device 801 through an input unit generating an ultrasonic signal, and performs wireless recognition.

According to one embodiment, the electronic device 801 may receive a user input from an external device (for example, a computer or server) connected thereto by using the communication module 820.

The display 860 (e.g. the display 150) may include a panel 862, a hologram device 864, or a projector 866.

The panel 862 may be, for example, a Liquid Crystal Display (LCD) and an Active Matrix Organic Light Emitting Diode (AM-OLED) display, and the like.

The panel 862 may be implemented to be, for example, flexible, transparent, or wearable. The panel 862 may be integrated with the touch panel 852 to be configured as one module.

The hologram device 864 displays a stereoscopic image in the air using interference of light.

The projector 866 projects light onto a screen to display an image. The screen may be located, for example, inside or outside the electronic device 801.

According to one embodiment, the display 860 may further include a control circuit for controlling the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) 878.

The interface 870 may be included in, for example, the communication interface 160 illustrated in FIG. 1. Additionally or alternatively, the interface 870 may include a Mobile High-definition Link (MHL) interface, a Secure Digital (SD) card/Multi-Media Card (MMC) interface, or an Infrared Data Association (IrDA) standard interface.

The audio module 880 bilaterally converts a sound and an electric signal. At least some elements of the audio module 880 may be included in, for example, the input/output interface 140 illustrated in FIG. 1. The audio module 880 processes sound information input or output through, for example, the speaker 882, the receiver 884, the earphones 886, or the microphone 888.

The camera module 891 is a device for capturing a still image or a video, and may include one or more image sensors (e.g., a front sensor or a rear sensor), a lens, an Image Signal Processor (ISP), or a flash (e.g., an LED or xenon lamp).

The power management module 895 manages power of the electronic device 801. The power management module 895 may include a Power Management Integrated Circuit (PMIC), a charger Integrated Circuit (IC), or a battery gauge.

The PMIC may be mounted, for example, in an integrated circuit or an SoC semiconductor. The charging methods may be classified into wired charging and wireless charging. The charger IC charges a battery and prevents inflow of excessive voltage or excessive current from a charger. The charger IC includes a charger IC for at least one of the wired charging type or the wireless charging type. Examples of the wireless charging include magnetic resonance charging, magnetic induction charging, and electromagnetic charging, and an additional circuit such as a coil loop, a resonance circuit, and a rectifier may be added for the wireless charging.

The battery gauge measures, for example, a residual quantity of the battery 896, or a voltage, a current, or a temperature during the charging. The battery 896 stores or generates electricity, and may supply power to the electronic device 801 by using the stored or generated electricity. The battery 896 may include a rechargeable battery or a solar battery.

The indicator 897 displays a specific status of the electronic device 801 or a part (for example the AP 810) of the electronic device 801, for example, a booting status, a message status, a charging status, and the like.

The motor 898 converts an electrical signal into a mechanical vibration.

The electronic device 801 may include a processing device (e.g., a GPU) for supporting a mobile TV. The processing device for supporting mobile TV processes media data according to standards such as, for example, a digital multimedia broadcasting (DMB), a digital video broadcasting (DVB) or a media flow.

Each of the described elements of the electronic device according to various embodiments of the present disclosure may include one or more components, and the name of a corresponding element may be changed based on the type of an electronic device. An electronic device according to various embodiments of the present disclosure may be configured to include at least one of the described elements, a few of the elements may be omitted, or an additional element may be further included. Also, some of elements of an electronic device according to various embodiments of the present disclosure may be combined into one entity, which may perform functions identical to those of the relevant elements before the combination.

The term "module" used in various embodiments of the present disclosure may refer to, for example, a unit including one or more combinations of hardware, software, and firmware. The "module" may be interchangeably used with a term, such as unit, logic, logical block, component, or circuit. The "module" may be the smallest unit of an integrated element or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) may be implemented by a command stored in a computer-readable storage medium in a programming module form. The commands, when executed by at least one processor (e.g., the processor 120), enables the at least one processor to perform functions corresponding to the commands. The computer-readable storage medium may be, for example, the memory 130. At least a part of the programming module may, be implemented (e.g., executed) by the processor 120. At least a part of the programming module may, include a module, a program, a routine, a set of instructions, or a process for performing at least one function.

The computer-readable recording medium may include magnetic media, such as a hard disk, a floppy disk, and a magnetic tape, optical media, such as a Compact Disc Read Only Memory (CD-ROM) and a Digital Versatile Disc (DVD), magneto-optical media, such as a floptical disk, and hardware devices specially configured to store and perform a program command (for example, programming module), such as a Read Only Memory (ROM), a Random Access Memory (RAM), a flash memory and the like. In addition, the program commands may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

According to various embodiments, a storage medium may store commands configured to be executed by at least one processor to perform at least one operation by the at least one processor, wherein the at least one operation may include a method of a first electronic device, the method including during booting, loading a modified BLE protocol stack, which includes at least two ATTs for use of an application stored in a first memory, in a second memory, performing a Bluetooth connection to a second electronic device through a physical layer and a link layer in the modified BLE protocol stack, determining whether an event is generated in a higher layer of the link layer in the BLE protocol stack, and according to a type of the event, transferring a command of the application to the second electronic device.

The transferring of the command of the application to the second electronic device include, transferring an ATT command of the application to the second electronic device through a first path including a first ATT protocol in the modified BLE protocol stack when the event relates to an ATT command in the first path, and transferring the ATT command of the application to the second electronic device through a second path including a second ATT protocol in the modified BLE protocol stack when the event relates to an ATT command in the second path.

The first path may include an application layer, a GATT, the first ATT protocol, a L2CAP, and a link layer.

The second path may include an audio layer, the second ATT protocol, a L2CAP, and a link layer.

The ATT command of the application may be an audio-related command.

The first ATT protocol may use a fixed channel identifier and the second ATT protocol may use a channel identifier allocated to a reserved area or a dynamic allocation area.

The modified BLE protocol stack may further include a third path including a DSP, an L2CAP, and a link layer.

As described above, by using a BLE protocol stack including a plurality of ATTs, it is possible to achieve concurrent processing.

Through one of the plurality of ATTs, it is possible to access a media task processing audio or audio-related commands. Therefore, audio or audio-related commands can be processed on the basis of the BLE protocol stack.

According to various embodiments of the present invention, a device is configured to store a modified Bluetooth Low Energy (BLE) protocol stack including at least two Attribute Protocols (ATTs) for use with an application, the modified BLE protocol stack including a first path and a second path, the first path including a first ATT protocol to process an ATT command of the application, the second path including a second ATT protocol to process an ATT command of the application and process data of the application including the ATT instruction, using the modified BLE protocol stack including the at least two ATTs of the Bluetooth control module.

According to various embodiments of the present invention, a device is configured to, during booting, load a modified Bluetooth Low Energy (BLE) protocol stack, which includes at least two ATTribute protocols (ATTs) for use of an application stored in a first memory, in a second memory, perform a Bluetooth connection to a second electronic device through a physical layer and a link layer in the modified BLE protocol stack, determine whether an event is generated in a higher layer of the link layer in the BLE protocol stack and according to a type of the event, and transfer a command of the application to the second electronic device.

According to various embodiments of the present invention, transferring the command of the application to the second electronic device comprises transferring an ATT command of the application to the second electronic device through a first path including a first ATT protocol in the modified BLE protocol stack when the event relates to an ATT command in the first path and transferring the ATT command of the application to the second electronic device through a second path including a second ATT protocol in the modified BLE protocol stack when the event relates to an ATT command in the second path.

Further, embodiments of the present disclosure disclosed herein and the accompanying drawings are merely examples for easily describing the technical contents of the present disclosure and for assisting in an understanding of the present disclosure; however, the present disclosure is not limited thereto. It should be understood by those skilled in the art that, in addition to the embodiments disclosed herein, all modifications and changes or modified and changed forms derived from the technical idea of the present disclosure fall within the scope of the present disclosure. Therefore, the scope of the present disclosure is defined not by the detailed description and embodiments, but by the following claims and their equivalents, and all differences within the scope will be construed as being included in the present disclosure.

What is claimed is:

1. An electronic device comprising:
   a Bluetooth control module that stores a modified Bluetooth Low Energy (BLE) protocol stack including at least two Attribute (ATT) Protocols for use with an application, the modified BLE protocol stack including a first path and a second path, the first path including a Generic Attribute profile (GATT) and a first ATT protocol to process a first ATT command of the application, the second path including an audio layer and a second ATT protocol to process a second ATT command of the application; and
   a processor coupled to the Bluetooth control module,
   wherein the processor processes data of the application including the first ATT command and the second ATT command, using the modified BLE protocol stack including the at least two ATTs of the Bluetooth control module, and
   wherein the first ATT protocol of the first ATT command and the second ATT protocol of the second ATT command are processed, by the electronic device, at a same time.

2. The electronic device of claim 1, wherein the first path further comprises an application layer, a Logical Link Control and Adaptation Protocol (L2CAP), and a link layer.

3. The electronic device of claim 1, wherein the second path further comprises an L2CAP, and a link layer.

4. The electronic device of claim 1, wherein the second ATT command, which is transferred through the second path of the application, is an audio-related command.

5. The electronic device of claim 1, wherein the first ATT protocol uses a fixed channel identifier and the second ATT protocol uses a channel identifier allocated to a reserved area or a dynamic allocation area.

6. The electronic device of claim 1, wherein the modified BLE protocol stack further comprises a third path including a Digital Signal Processing (DSP), an L2CAP, and a link layer.

7. The electronic device of claim 1, wherein the application is a hearing aid-related application.

8. An electronic device comprising:
   a memory;
   at least one processor; and
   at least one module stored in the memory and configured to be executable by the at least one processor,
   wherein the module:
   during booting, loads a modified Bluetooth Low Energy (BLE) protocol stack, which includes a first path having a Generic Attribute profile (GATT) and a first Attribute (ATT) protocol, and a second path having an audio layer and a second ATT protocol, for use with an application stored in a first memory, in a second memory;
   performs a Bluetooth connection to a second electronic device through a physical layer and a link layer in the modified BLE protocol stack;
   determines whether an event is generated in a higher layer of the link layer in the BLE protocol stack; and
   according to a type of the event, comprises a command for transferring a command of the application to the second electronic device,
   wherein the first ATT protocol of a first ATT command and the second ATT protocol of a second ATT command are processed by the electronic device, at a same time.

9. The electronic device of claim 8, wherein the command for transferring a command of the application to the second electronic device transfers an ATT command of the application to the second electronic device through the first path including the GATT and the first ATT protocol in the modified BLE protocol stack when the event relates to the first ATT command in the first path, and transfers the ATT command of the application to the second electronic device through the second path including an audio layer and the second ATT protocol in the modified BLE protocol stack when the event relates to the second ATT command in the second path.

10. The electronic device of claim 9, wherein the first path further comprises an application layer, a Logical Link Control and Adaptation Protocol (L2CAP), and a link layer.

11. The electronic device of claim 9, wherein the second path further comprises an L2CAP and a link layer.

12. The electronic device of claim 9, wherein the second ATT command, which is transferred through the second path of the application, is an audio-related command.

13. The electronic device of claim 9, wherein the first ATT protocol uses a fixed channel identifier and the second ATT protocol uses a channel identifier allocated to a reserved area or a dynamic allocation area.

14. The electronic device of claim 9, wherein the modified BLE protocol stack further comprises a third path including a Digital Signal Processing (DSP), an L2CAP, and a link layer.

15. A method of a first electronic device, the method comprising:
   during booting, loading a modified Bluetooth Low Energy (BLE) protocol stack, which includes a first path having a Generic Attribute profile (GATT) and a first Attribute (ATT) protocol, and a second path having an audio layer and a second ATT protocol, for use with an application stored in a first memory, in a second memory;
   performing a Bluetooth connection to a second electronic device through a physical layer and a link layer in the modified BLE protocol stack;
   determining whether an event is generated in a higher layer of the link layer in the BLE protocol stack; and
   according to a type of the event, transferring a command of the application to the second electronic device,
   wherein the first ATT protocol of a first ATT command and the second ATT protocol of a second ATT command are processed, by the first electronic device, at a same time.

16. The method of claim 15, wherein transferring the command of the application to the second electronic device comprises:
   transferring an ATT command of the application to the second electronic device through the first path including the GATT and the first ATT protocol in the modified BLE protocol stack when the event relates to the first ATT command in the first path, and
   transferring the ATT command of the application to the second electronic device through the second path including an audio layer and the second ATT protocol in the modified BLE protocol stack when the event relates to the second ATT command in the second path.

17. The method of claim 16, wherein the first path further comprises an application layer, a Logical Link Control and Adaptation Protocol (L2CAP), and a link layer.

18. The method of claim 16, wherein the second path further comprises an L2CAP and a link layer.

19. The method of claim 16, wherein the second ATT command, which is transferred through the second path of the application, is an audio-related command.

20. The method of claim 16, wherein the first ATT uses a fixed channel identifier and the second ATT protocol uses a channel identifier allocated to a reserved area or a dynamic allocation area.

* * * * *